Oct. 4, 1949.   H. H. RAUH   2,483,561
DEVICE FOR AERATING WATER IN
MINNOW BUCKETS OR THE LIKE
Filed Jan. 10, 1946

INVENTOR.
Herbert H. Rauh
BY
Wood, Arey, Herron & Evans
ATTORNEYS

Patented Oct. 4, 1949

2,483,561

UNITED STATES PATENT OFFICE 2,483,561

DEVICE FOR AERATING WATER IN MINNOW BUCKETS OR THE LIKE

Herbert H. Rauh, Columbus, Ohio

Application January 10, 1946, Serial No. 640,335

2 Claims. (Cl. 261—122)

This invention relates to the piscatorial art and is particularly directed to a device for use in the transportation and maintenance of fishing bait, such as minnows, in a healthy and vitalized condition for fishing purposes. Specifically, the present inventor has directed his invention to the problem of transporting the minnows, or other live bait, by automobile or any other vehicle employing pneumatic tires.

Fishermen have long recognized and attempted to find an efficient solution to the problem of keeping minnows in a vitalized condition when transporting them over considerable distances. A great many types of minnow buckets have been designed and patented wherein air has been continuously supplied to the water from a cylinder or container within the bucket. Naturally, these buckets, or minnow pails, are of involved and expensive construction and it is necessary to maintain charged cylinders at all times.

It has been the object of the present inventor to provide an aerating device adaptable for use with any minnow bucket, or, in fact, with any receptacle which will hold water. More particularly, it has been the purpose to provide a device of this character which is in the nature of an attachment. In conjunction with this objective, the inventor has taken advantage of the fact that most modern automobiles have the spare tire mounted within the trunk or the luggage compartment and he has therefore provided a means for connecting the valve stem of the tire to a minnow bucket within the compartment. Since the minnow bucket is normally carried within the luggage compartment, it is quite obvious that this arrangement is convenient and practical.

In adapting the device to the use, the inventor has provided an air feeding arrangement which may be disposed in the minnow bucket and which will permit an exceedingly slow escape of air from the tire through its valve stem. In fact, the escape of air is so slow that it is minutely dispersed and creates a mist rather than bubbles and therefore mixes quite thoroughly with the water.

A further advantage of the present construction is that it is exceedingly simple, and, when attached to the tire valve stem, automatically opens the tire valve and immediately constitutes the escape means immersed in the minnow bucket as the slow feed control device.

Thus, the present inventor has afforded a facility to the fishermen which is readily usable within any modern, standard luggage compartment and one which may be placed in position of use in a matter of seconds.

Other objects and certain advantages of the invention will be more fully apparent from a description of the drawings, in which.

Figure 1:
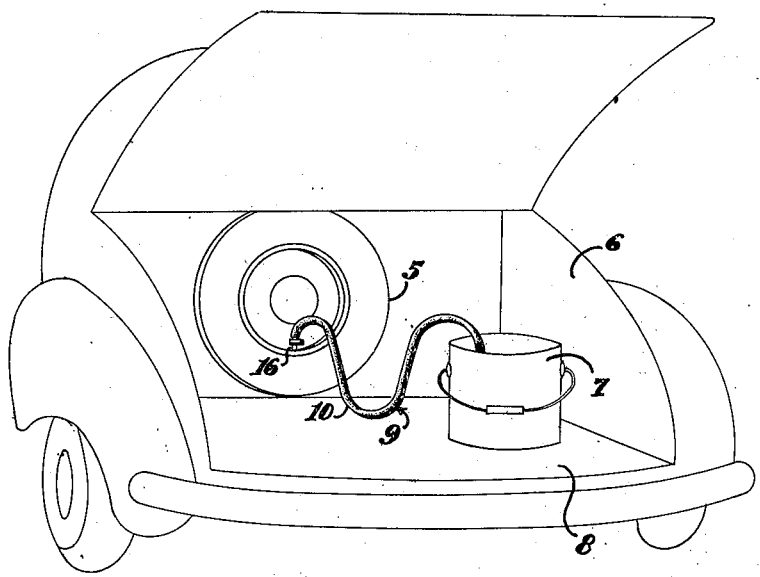
Figure 1 is a perspective view of the interior of a luggage compartment showing the minnow bucket in place with the device of this invention attached to the tire and delivering the air to the bucket.
Figures 2, 3:
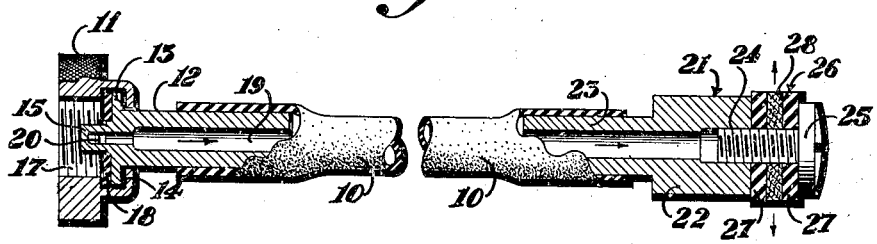
Figure 2 is a sectional view taken diametrically of the end of the device for coupling the same to the tire valve stem.
Figure 3 is a sectional view taken diametrically through the device which slowly releases the air at the bottom of the minnow bucket.

Referring to the drawings, it will be observed that a typical modern arrangement of the tire within the luggage compartment is illustrated. Referring specifically to Figure 1, the tire is indicated at 5 and is contained within a luggage compartment 6. The minnow bucket 7 is shown resting upon the floor 8 of the compartment 6. The device of the invention is generally identified at 9 and consists of the following arrangement of parts:

A hose 10 of a length sufficient to reach from the tire to any point in the compartment is supplied. One end of this hose incorporates a coupling means consisting of a knurled rotatable member 11 loosely secured on a nipple or sleeve 12. The sleeve 12 has a flange 13 which is disposed within an annular groove 14 at the rear of the coupling member. The rear sleeve portion of the coupling member 11 is turned inwardly upon the flange 13 of the sleeve to form the annular groove 14. This relationship holds the coupling member loosely in position for rotation.

The sleeve or nipple 12 is inserted in one end of the hose 10. This nipple includes an axial extension 15 at its end within the coupling means 11 which extension is adapted to engage the end of the tire valve for the purpose of unseating the valve when the coupling element is screwed upon the stem 16 of the tire.

The coupling element includes a screw threaded bore 17 and the flange 13 has a sealing washer 18 disposed against its face. This sealing washer contacts the outer end of the tire valve stem and seals the connection of the coupling element thereto. The extension 15 provides a solid outer valve contact end, the passageway 19 of the nipple being directed transversely through this extension as at 20. Thus, when the coupling element is screwed down tightly upon the stem, a sealed connection is established and flow of air from the tire takes place through the hose.

Figure 4:
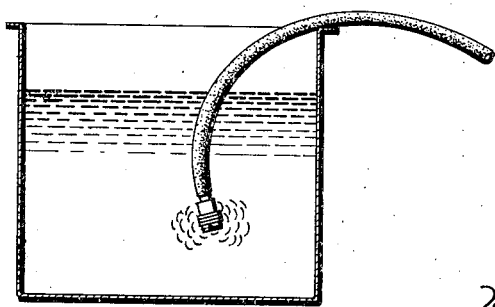
Figure 4 is a sectional view taken vertically of a minnow bucket and showing the device delivering air thereto.

The other end of the hose carries an air-flow control means 21, which will permit extremely slow discharge or bleeding of the air. As indicated, the outer end of the hose is disposed at the bottom of the minnow bucket (Figure 4) within the water. The air escape device consists of a body element 22 including a nipple 23 inserted in the hose. The outer end of the bore 24 of the body element is screw threaded to receive the screw threaded portion of a screw element 25.

An assemblage of washers 26 is inserted between the head of the screw element and the end of the body. The assemblage of washers consists of outer rubber washers 27—27 and an intermediate fibrous washer 28. The fibrous washer is of such texture and composition as to permit extremely slow escape of air through the fibers and the amount of escape may be controlled by adjusting the screw element upon the assemblage of washers. The screw threads of the screw element and the bore are formed so as to provide a loose fit, that is, a fit sufficient to permit a leakage of air along the screw threads.

Thus, when the device, or attachment, is applied to the tire and the hose inserted in the minnow pail, with the bleeder valve arrangement at the bottom of the bucket, the air discharged therefrom creates a mist rather than bubbles, so that the air has a chance to mix and thoroughly aerate the water. It is extremely important that the device provide for extremely fine diffusion of air, otherwise, the bubbles would escape to the top of the water and the air would be lost. Visually, there is no apparent escape of air so fine is the discharge. The fibrous washer is effective for breaking up the air, causing it to come out the end of the hose in minute quantities.

Having described my invention, I claim:

1. An attachment for aerating a minnow bucket to be carried by a motor vehicle or the like having an inflated spare tire comprising; a length of hose having coupling means at one end adapted to be attached to the valve stem of said tire to withdraw air therefrom and an air flow control and diffuser device at the other end adapted to be immersed in the bucket, said device comprising; a nipple, a screw threaded onto the end of the nipple, the threads being loose enough to permit passage of air and a washer adjustably compressed between the head of the screw and the end of the nipple, said washer being porous, whereby air may escape into the bucket in a finally dispersed condition.

2. An air flow control and dispersing device adapted to be immersed into a minnow bucket or the like comprising; a tubular nipple, a screw threaded into one end of said nipple, the threads being loose enough to permit passage of air about the screw, an assemblage of washers between the head of the screw and the end of the nipple, said assemblage including outer washers and an intermediate fibrous and porous washer adjustably compressible between the outer washers and through which the air may escape in finally dispersed condition.

HERBERT H. RAUH.

REFERENCES CITED

The following references are of record in the file of this patent:

UNITED STATES PATENTS

| Number | Name | Date |
| --- | --- | --- |
| 490,508 | Shaw | Jan. 24, 1893 |
| 934,367 | Steel | Sept. 14, 1909 |
| 1,207,133 | Byard | Dec. 5, 1916 |
| 1,284,824 | Upton | Nov. 12, 1918 |
| 1,492,838 | Dilweg | May 6, 1924 |
| 1,939,583 | Welhausen | Dec. 12, 1933 |
| 2,008,363 | Maris | July 16, 1935 |
| 2,078,171 | Wittie | Apr. 20, 1937 |
| 2,158,576 | Glanly | May 16, 1939 |
| 2,166,574 | Adolphsen | July 18, 1939 |
| 2,172,799 | Magnus | Sept. 12, 1939 |
| 2,328,970 | Farquhar | Sept. 7, 1943 |